(12) United States Patent
Tanaka

(10) Patent No.: US 8,836,881 B2
(45) Date of Patent: Sep. 16, 2014

(54) LIQUID CRYSTAL DISPLAY DEVICE

(75) Inventor: Shigekuni Tanaka, Chiba (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 594 days.

(21) Appl. No.: 12/003,209

(22) Filed: Dec. 20, 2007

(65) Prior Publication Data

US 2008/0151138 A1 Jun. 26, 2008

(30) Foreign Application Priority Data

Dec. 26, 2006 (JP) .................................. 2006-349812

(51) Int. Cl.
*G02F 1/1333* (2006.01)
*G02F 1/1335* (2006.01)
*F21V 7/04* (2006.01)
*H04M 1/02* (2006.01)

(52) U.S. Cl.
CPC ....... *G02F 1/133308* (2013.01); *H04M 1/0266* (2013.01)
USPC ................. 349/58; 349/61; 349/62; 362/632; 362/633; 362/634

(58) Field of Classification Search
CPC ................................................ G02F 1/133308
USPC ................................................ 349/61–65, 58
See application file for complete search history.

(56) References Cited

U.S. PATENT DOCUMENTS

| | | | |
|---|---|---|---|
| 5,274,486 A | 12/1993 | Yamazaki et al. | |
| 5,929,950 A * | 7/1999 | Matsuda | 349/60 |
| 6,201,586 B1 * | 3/2001 | Nakayama | 349/58 |
| 6,593,979 B1 * | 7/2003 | Ha et al. | 349/58 |
| 6,950,154 B2 * | 9/2005 | Lee | 349/58 |
| 7,033,063 B2 * | 4/2006 | Cha et al. | 362/632 |
| 7,623,195 B2 * | 11/2009 | Park et al. | 349/58 |
| 2002/0080298 A1 * | 6/2002 | Fukayama | 349/58 |
| 2003/0048629 A1 * | 3/2003 | Kim et al. | 362/27 |
| 2003/0223020 A1 * | 12/2003 | Lee | 349/58 |
| 2003/0234896 A1 * | 12/2003 | Kim | 349/65 |
| 2005/0280750 A1 | 12/2005 | Cho et al. | |

FOREIGN PATENT DOCUMENTS

JP 2005-338497 5/2004

\* cited by examiner

*Primary Examiner* — Hoan C Nguyen
(74) *Attorney, Agent, or Firm* — Juan Carlos A. Marquez

(57) ABSTRACT

The present inventions enables reduction of outside dimensions of a small-size liquid crystal display device for a mobile phone and also elimination of an inclination of an image display area.
A liquid crystal display panel 1 is mounted on a mold 6 made of resin. Because the mold 6 has not a wall surrounding the liquid crystal display panel 1, outside dimensions of the frame 7 can be made smaller. When the mold 6 with the liquid crystal display panel 1 mounted thereof is set in the frame 7, the mold 6 elastically deforms, and an inclination of a display area 31 of the liquid crystal display panel 1 is corrected by projections 62 formed on the mold 6.

13 Claims, 9 Drawing Sheets

LIQUID CRYSTAL DISPLAY DEVICE

CLAIM OF PRIORITY

The present application claims priority from Japanese Application JP 2006-349812 filed on Dec. 26, 2006, the content of which is hereby incorporated by reference into this application.

BACKGROUND OF THE INVENTION

1. Field of the Invention

The present invention relates to a liquid crystal display device, and more particularly to a technique for making smaller outside dimensions of a compact-size display device such as a mobile phone.

2. Description of the Related Art

There is the strong need for making outside dimensions of a liquid crystal display device as smaller as possible with the size of a screen kept at a constant level. This need is especially strong in the field of display devices such as liquid crystal display devices for mobile phones in which outside dimensions of a device are required to be small as much as possible.

A liquid crystal display device for a mobile phone or the like includes a thin film transistor substrate and a color filter substrate in combination. The thin film transistor substrate has such a structure that pixel electrodes and thin film transistors for controlling pixel data signals to the pixel electrodes are formed in the matrix state. The color filter substrate is formed with a color filter used for creating color images. Then a lower polarization plate is attached to a bottom of the thin film transistor substrate and an upper polarization plate is attached to a top surface of the color filter substrate to form a liquid crystal display panel. A back light having several optical components is provided on a rear surface of a liquid crystal display panel.

The liquid crystal display panel and the back light are accommodated in a mold made of resin. On the other hand, a flexible wiring substrate for supplying power, electric signals or the like is mounted to the liquid crystal display panel. Because an area of the flexible wiring substrate is large, the flexible wiring substrate is folded back onto a rear surface of the back light. The mold accommodating the liquid crystal display panel and the backlight therein and the flexible wiring substrate folded back as described above are accommodated within a frame generally made of metal. The liquid crystal display device having the configuration as described above is described, for instance, in JP-A-2005-338497.

SUMMARY OF THE INVENTION

FIG. 14 is a plan view illustrating a liquid crystal display device based on the conventional technique, while FIG. 15 is a cross-sectional view taken along the line A-A in FIG. 12. In FIG. 14, a color filter substrate 3 is combined with a thin film transistor substrate 2, and an upper polarization plate 8 is attached to the color filter substrate 3. A lower polarization plate 9 is attached to a bottom surface of the thin film transistor substrate 2. The upper polarization plate 8 is regarded as a display area where an image is displayed. A liquid crystal display panel 1 is composed of the thin film transistor substrate 2, the color filter substrate 3, the lower polarization plate 9, and-the upper polarization plate 8. The liquid crystal display panel 1 is accommodated in a mold 6 generally made of resin. Mounted on the thin film transistor substrate 2 are an IC driver 4 for driving the liquid crystal display panel 1, a flexible wiring substrate, and the like. Because the flexible wiring substrate 5 has a large area, the flexible wiring substrate 5 is folded back onto a rear surface of the liquid crystal display panel 1.

In FIG. 14, to accommodate the liquid crystal display panel 1 within the mold 6, an internal diameter of the mold 6 is required to be larger than that of an external diameter of the liquid crystal display panel 1. In such a case, the liquid crystal display panel 1 will sometimes be mounted within the mold in the inclined posture. The liquid crystal display panel 1 is attached to the mold 6 with an adhesive tape 10. The mold 6 with the liquid crystal display panel 1 attached therein in the inclining posture is installed as it is inside a metal-made frame 7. A notch 71 in which a claw 63 of the mold 6 is inserted is formed in a portion of the frame 7. The mold 6 is fixed to the frame 7 with a claw 63 attached to a side of the mold 6.

FIG. 15 is a cross-sectional view taken along the line A-A in FIG. 14. In FIG. 15, a-back light including various optical components is provided under the liquid crystal display panel 1. As shown in FIG. 14, a wall 61 of the mold 6 is provided along the entire periphery, and the liquid crystal display panel 1 is accommodated within this mold 6. The wall 61 of this mold 6 is present between the liquid crystal display panel 1 and the frame 7, which brings about a cause with which outside dimensions of the frame 7 are made larger, namely outside dimensions of the liquid crystal display device. Specifically, the mold is formed by injection molding. In the case of injection molding, the wall 61 is required to have a thickness of about 0.4 mm at least, and when allowance for assembly is taken into consideration, the outside dimension will be made larger by 1 mm or more in the both sides.

Another problem in the conventional technique is that, if the liquid crystal display panel 1 is provided in the inclined posture in the mold, the liquid crystal display device panel 1 will be assembled as a final product as it is. FIG. 16 is a view illustrating a step during an operation for installing the mold 6 accommodating therein the liquid crystal display panel 1 and the back light inside a frame. The mold 6 having the wall 61 has a high mechanical strength, and the liquid display panel 1 is strongly fixed to the mold 6 with the adhesive tape 10. Therefore, when the mold 6 is accommodated in the frame 7, the metal frame 7 deforms outward as shown in FIG. 16 without deforming the mold 6, and thus the mold 6 is accommodated within the frame 7. Then the claw 63 is inserted into a notch portion of the frame 7 to complete the liquid crystal display device. However, in the liquid crystal display device completed as described above, a display surface of the liquid crystal display panel 1 and an outer shape of the frame 7 remained inclined as shown in FIG. 14 and FIG. 15. In other words, in FIG. 15 which is a cross sectional view taken along the line A-A in FIG. 14, a center of the liquid crystal display panel 1 is displaced from that of the frame 7 by a distance a.

Objects of the present invention are to make smaller outside dimensions of a liquid crystal display device, and to prevent a display surface of a liquid crystal display device from inclining with respect to a contour thereof.

To solve the problems as described above, in the present invention, a wall of a mold is eliminated, and when the mold is inserted into a frame, elastic deformation of the mold easily occur, so that an outer shape of a liquid crystal display device can be made smaller, and at the same time inclination of a display surface can be eliminated. More specifically, a configuration of the liquid crystal display device according to the present invention is as described below.

(1) According to one aspect of the present invention, a liquid crystal display device comprises:

a liquid crystal display panel including a TFT substrate on which pixel electrodes and thin film transistors for controlling signals to the pixel electrodes are provided in the matrix state, and a color filter substrate on which color filters associated with the pixel electrodes are formed; and a mold on which the liquid crystal display panel is placed;

wherein projections are formed on a longer edge of the mold in the discontinuous state, and the liquid crystal display panel is installed in the inner side from the projections.

(2) The liquid crystal display device described in (1) above, in which a plurality of discontinuous projections are formed on a longer edge of the mold.

(3) The liquid crystal display device described in (1) above, in which two projections are formed in the discontinuous state on each of the longer edges of the mold.

(4) The liquid crystal display device described in (1) above, in which the discontinuous projections formed on a longer edge of the mold are formed at a position corresponding to a portion where the TFT substrate and the color filter substrate of the liquid crystal display panel are overlaid on each other.

(5) According to another aspect of the present invention, a liquid crystal display device comprises:

a liquid crystal display panel including a TFT substrate on which pixel electrodes and thin film transistors for controlling signals to the pixel electrodes are provided in the matrix state, and a color filter substrate on which color filters associated with the pixel electrodes are formed; and a mold on which the liquid crystal display panel is placed;

wherein projections are provided in a shorter edge of the mold in the discontinuous state, and the liquid crystal display panel is installed in the inner side from the projections.

(6) The liquid crystal display device described in (5), in which the discontinuous projections formed on a shorter edge of the mold are formed at a position corresponding to a portion of the liquid crystal display panel in which the TFT substrate and the color filter substrate are overlaid on each other.

(7) The liquid crystal display panel described in (5) above, in which a flexible wiring substrate for supplying power and image signals to the liquid crystal display panel is attached to a shorter edge of the TFT substrate, and the discontinuous projections are not provided on an edge of the mold corresponding to the edge of the TFT substrate with the flexible wiring substrate attached thereto.

(8) According to still another aspect of the present invention, a liquid crystal display device comprises:

a liquid crystal display panel including a TFT substrate on which pixel electrodes and thin film transistors for controlling signals to the pixel electrodes are provided in the matrix state, and a color filter substrate on which color filters associated with the pixel electrodes are formed;

a mold on which the liquid crystal display panel is placed; and a frame for accommodating the mold therein;

wherein projections are formed on a top surface of the mold along a longer edge thereof in the discontinuous state; the liquid crystal display panel is installed in the inner side from the projections; a notch is formed on a side face of the frame; and a claw to be inserted into the notch on the frame is formed on a side face of the mold.

(9) The liquid crystal display device described in (8) above, in which the projection formed on a top surface of the mold along a longer edge thereof and the claw formed on a side face of the mold along a longer edge thereof are formed at the same position on the mold.

(10) The liquid crystal display device described in (5), which two projections and two claws of the mold are formed on a longer edge of the mold, and two notches of the frame are formed on a longer edge of the frame.

(11) According to still further aspect of the present invention, a liquid crystal display device comprises:

a liquid crystal display panel including a TFT substrate on which pixel electrodes and thin film transistors for controlling signals to the pixel electrodes are provided in the matrix state, and a color filter substrate on which color filters associated with the pixel electrodes are formed; and a mold on which the liquid crystal display panel is placed;

wherein projections are formed on a shorter edge of the mold in the discontinuous state; the liquid crystal display panel is installed in the inner side from the projections; a notch is formed on a side face of the frame along a shorter edge thereof, and wherein a claw to be inserted into the notch on the frame is formed on a side face of the mold along a shorter edge thereof.

(12) The liquid crystal display device described in (11), in which the discontinuous projections formed on a shorter edge of the mold are formed at a position corresponding to a portion where the TFT substrate and the color filter substrate of the liquid crystal display panel are overlaid on each other.

(13) The liquid crystal display device described in (11) above, in which a flexible wiring substrate for supplying power and image signals is attached to a shorter edge of the TFT substrate, and the discontinuous projections are not provided on an edge of the mold corresponding to the edge of the TFT substrate with the flexible wiring substrate attached thereto.

Because the mold according to the present invention has no wall, outside dimensions of the liquid crystal display device can be reduced by part corresponding to a wall thickness of the mold. Furthermore, because the mold according to the present invention has no wall, elastic deformation of the mold easily occurs. In addition, because the mold has projections on a top surface of the mold and the projections function as stoppers for preventing movement of the liquid crystal display panel in the horizontal direction, it is possible to prevent a display area of the liquid crystal display panel from being inclined with respect to the liquid crystal display device. Effects provided by each are as follows:

With the means (1), because there is no wall in the mold on which a liquid crystal display panel is mounted, outside dimensions of a liquid crystal display device can be reduced. Furthermore, because there is no wall in the mold, elastic mold of the mold easily occurs. In addition, the mold has projections on a top surface of the mold and the projections function as stoppers for preventing movement of the liquid crystal display panel in the horizontal direction, and therefore it is possible to adjust inclination of a display area of a liquid crystal display panel when the liquid crystal display panel and a frame are assembled with each other.

With the means (2), because a plurality of discontinuous projections are formed on a longer edge of the mold, it is possible to easily adjust inclination of a display area of a liquid crystal display panel on the mold.

Because of the means (3) above, two projections are formed on each of the longer edges of the mold, it is possible to effectively adjust inclination of a display area of a liquid crystal display panel on the mold.

With the means (4) above, because the projections formed on the mold are formed at a position corresponding to a portion where the TFT substrate and the color filter substrate of the liquid crystal display panel are overlaid on each other, it is possible to avoid the possibility that a glass substrate constituting a liquid crystal display panel may be broken by the projections on the mold.

With the means (5) above, the same effect as described by the means (1) are exhibited also on shorter edge sides of the liquid crystal display panel, and also dimensions of the liquid crystal display panel in the shorter edge sides can be reduced.

With the means (6) above, because the projections formed on shorter edges of the mold abuts the portion where a TFT substrate and a color filter substrate of the liquid crystal display panel are overlaid on each other, a glass substrate of the liquid crystal display panel is not broken by the projections.

With the means (7) above, because the projections are not provided on an edge of the mold corresponding to the edge of the TFT substrate with the flexible wiring substrate attached thereto, the projection and a portion of the TFT substrate contact each other, which prevents the TFT substrate from being broken.

With the means (8) above, when the mold with a liquid crystal display panel mounted thereon is inserted into a frame, the mold elastically deforms, and therefore it is possible to automatically adjust inclination of a display surface of the liquid crystal panel.

With the means (9) above, because the projection formed on a top surface of the mold along a longer edge thereof and the claw formed on a side face of the mold along a longer edge thereof are formed at the same position on the mold, it is possible to effectively adjust inclination of a display area of the liquid crystal display panel.

With the means (10) above, two projections are formed on a longer edge of the mold, it is possible to effectively adjust inclination of a display area of the liquid crystal display panel.

With the means (11) above, when the mold with a liquid crystal display panel mounted thereon is inserted into a frame, the mold is elastically deformed by the claws formed on shorter edges of the mold, and therefore it is possible to automatically adjust inclination of a display surface of the liquid crystal display panel.

With the means (12) above, the projections formed on the mold abuts a portion where the TFT substrate and the color filter substrate of the liquid crystal display panel are overlaid on each other, and therefore it is possible to prevent a glass substrate of the liquid crystal display panel from being broken.

With the means (13) above, because the projections are not provided on an edge of the mold associated with the edge of the TFT substrate with the flexible wiring substrate attached thereto, it is possible to prevent the TFT substrate from being broken due to contact of the projection with a TFT substrate.

DETAILED DESCRIPTION OF THE PREFERRED EMBODIMENTS

The present invention is described in detail below with reference to there related drawings.

First Embodiment

Figure 1:
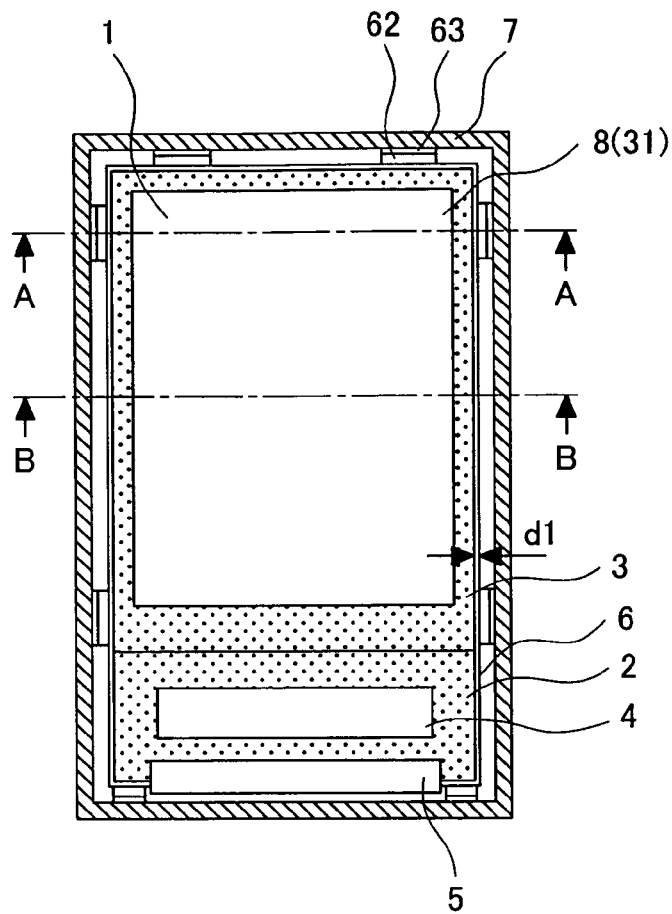
FIG. 1 is a plan view illustrating a liquid crystal display device according to a first embodiment of the present invention.
Figure 2:
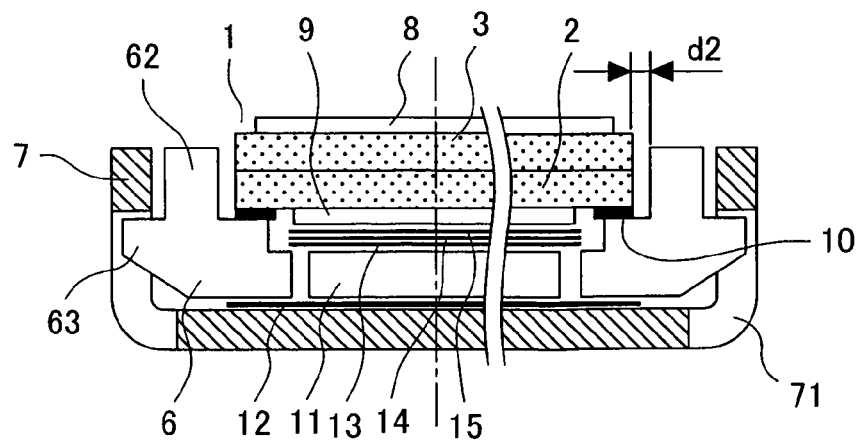
FIG. 2 is a across-sectional view taken along the line A-A in FIG. 1.
Figure 3:
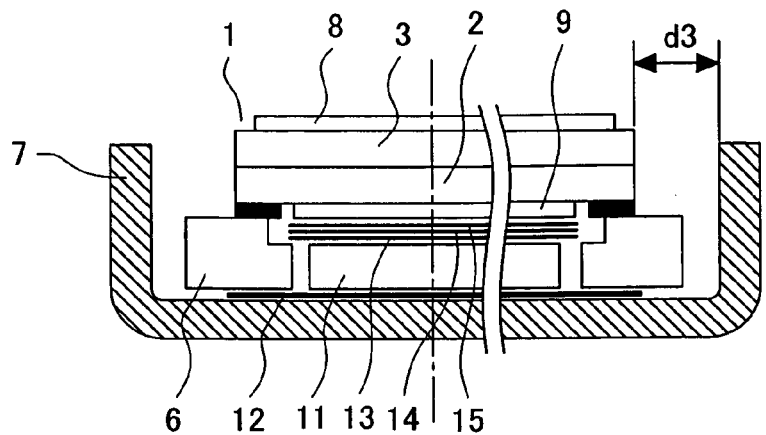
FIG. 3 is a cross-sectional view taken along the line B-B in FIG. 1.

FIG. 1 is a plan view illustrating a liquid crystal display device according to a first embodiment of the present invention. FIG. 2 is a cross-sectional view of the liquid crystal display device taken along the line A-A in FIG. 1. FIG. 3 is a cross-sectional view illustrating the same taken along the line B-B in FIG. 1. In FIG. 1, a TFT substrate 2 and a color filter substrate 3 are attached to each other with a sealing material at the respective peripheral areas, and a liquid crystal is provided in the inside of the sealing material. Because a flexible wiring substrate 5 is mounted on the TFT substrate 2 to supply power and electric signals to an IC driver 4 for driving a liquid crystal display panel 1 and to the liquid crystal display panel 1, the size of the TFT substrate 2 is larger than that of the color filter substrate 3. The flexible wiring substrate 5 is folded back onto a rear surface of the liquid crystal display panel 1. An upper polarization plate 8 is attached to a top surface of the color filter substrate 3. The upper polarization plate 8 substantially corresponds to a display surface.

A lower polarization plate 9 is attached to a bottom of the thin film transistor substrate 2. Light from a back light is polarized to a linearly-polarized beam by the lower polarization plate 9, and forms an image under controls by the liquid crystal for each pixel on the liquid crystal panel. The light from the back light modulated by the liquid crystal is again polarized by the upper polarization plate 8 and becomes visible to a human eye.

As shown in FIG. 2, a back light is provided under the lower polarization plate 9 attached to the thin film transistor substrate 2. The back light comprises a light source not shown and the optical components shown in FIG. 2. Generally a light-emitting diode (LED) is used as a light source for a liquid crystal display device used, for instance, in a mobile phone. This LED is attached to the flexible wiring substrate 5 extending on a rear surface of the back light and is provided on a side face of a light-guiding plate 11.

The mounting base 11 is to direct light from the light source provided on a side face of the light-guiding plate 11 toward the liquid crystal display panel. A reflection sheet 12 is provided under the mounting base 11. The reflection sheet 12 is attached to a lower surface of the mold 6, and supports the light-guiding plate. The reflection sheet 12 plays a role to reflect light directed downward by the light-guiding plate 11 to the side of the liquid crystal display panel to improve efficiency in use of the light. The light-guiding plate 11 is made of, for example, a transparent acrylic plate.

A lower diffusion sheet 13 is provided on the light-guiding plate 11. An LED is generally used as a light source. Because an LED is a point source of light, brightness of the light directed from the light-guiding plate 11 toward the liquid crystal display panel is not uniform because of influences by the point source of light. The lower diffusion sheet 13 plays a role to make uniform brightness of the light from the light-guiding plate 11 to the liquid crystal display panel 1. The lower diffusion sheet 13 is, for instance, a thickness of 0.04 mm.

Provided on the lower diffusion sheet 13 are a lower prism sheet 14 and an upper prism sheet 15. A prism sheet has on one side a number of prisms each extending in one direction and having a triangular cross-section at fine pitches. The pitch between the prisms is, for instance, 0.05 mm. The prism sheet plays a role to direct light from the back light toward the liquid crystal display panel by focusing the light to a vertex of a triangle of each prism to enhance the efficiency of the back light.

The direction in which the prisms on the lower prism sheet 14 extend and the direction in which the prisms on the upper prism sheet 15 extend are substantially perpendicular with respect to their planes. For instance, the prisms on the lower prism sheet 14 direct light propagating leftward and rightward of the lower surface to the liquid crystal display panel, while the prisms on the upper prism sheet direct light propagating upward and downward of the screen to the liquid crystal display panel. This allows light from the back light to efficiently be directed to the liquid crystal display panel. The lower and upper prism sheets are a thickness of about 0.06 mm, respectively.

When the prism sheet is viewed in the horizontal direction, the brightness is high at a level close to vertexes of the prisms and low at a level close to bottoms of the prisms. Namely, bright stripes and dark stripes are formed at fine pitches. Image signal lines are formed in the vertical direction on the thin film transistor substrate 2 at a prespecified pitch, while scan lines are formed in the horizontal direction thereon also at a prespecified pitch. Light from the back light cannot pass through the signal lines, and therefore, are bright pixel portions and dark portions such as the signal lines are present on the screen at a fine pitch. As a result, interferences occur between the prism sheets and the liquid crystal display panel 1 to generate moiré.

To make the moiré not so visible, in this embodiment, the lower polarization plate 9 is hazed to diffuse light from the upper prism sheet 15. Without hazing of the lower polarization plate 9, an upper diffusion sheet may be provided between the upper prism sheet 15 and the lower polarization plate 9. The optical components of the back light as described above are accommodated in the mold.

As shown in FIG. 1, there is not the wall 61 in the mold 6 according to the present invention, which is a different point from the conventional technique. Therefore, the liquid crystal display panel 1 is mounted on the mold 6. However, two projections 62 are provided on each of the longer edges and two projections 62 are provided on each of the shorter edges to prevent the liquid crystal display panel 1 from being displaced in the vertical or horizontal direction. A clearance d1 is present between the liquid crystal display panel 1 and the inner side of the projection so that the liquid crystal display panel 1 can be inserted into a space defined by the projections 62. The thin film transistor substrate 2 of the liquid crystal display panel 1 and the mold 6 are connected to each other with an adhesive tape 10. This adhesive tape 10 also plays a role as a light-shielding film to prevent degradation of contrast around the screen when light from the back light comes into sides of the liquid crystal display panel 1.

A claw 63 extending outward from the mold 6 is formed on the mold 6 at a position corresponding to the projection 62. This claw 63 is inserted into a notch 71 formed on the frame 7, and the mold 6 is fixed in the frame. FIG. 2, which is a cross-sectional view taken along the line A-A, shows the state. FIG. 3 is a cross-sectional view taken along the line B-B in FIG. 1, and illustrates a cross section of the mold 6 where there is neither the projection 62 nor the claw 63. In FIG. 3, a clearance between an edge of the liquid crystal display panel 1 and an inner surface of the frame 7 looks larger, but the dimension is exaggerated in relation to FIG. 2, and a value of the clearance d3 for the actual product is 0.2 mm or below. Namely, since there is no wall of the mold 6 in the present invention, outside dimensions of the frame 7 can be made smaller proportionately.

As shown in FIG. 1 and FIG. 2, the liquid crystal display panel 1 and a display area 31 are installed without any inclination with respect to the contour of the mold 6 and the frame 7. In other words, in FIG. 2, the distance d2 between an edge portion of the liquid crystal display panel 1 and the projection 62 formed on the mold 2 is identical in both sides of the liquid crystal display device. Furthermore, the distance d3 between an edge portion of the liquid crystal display panel 1 and the inner side of the frame 7 is identical in both sides of the liquid crystal display device shown in FIG. 3.

Figure 4:
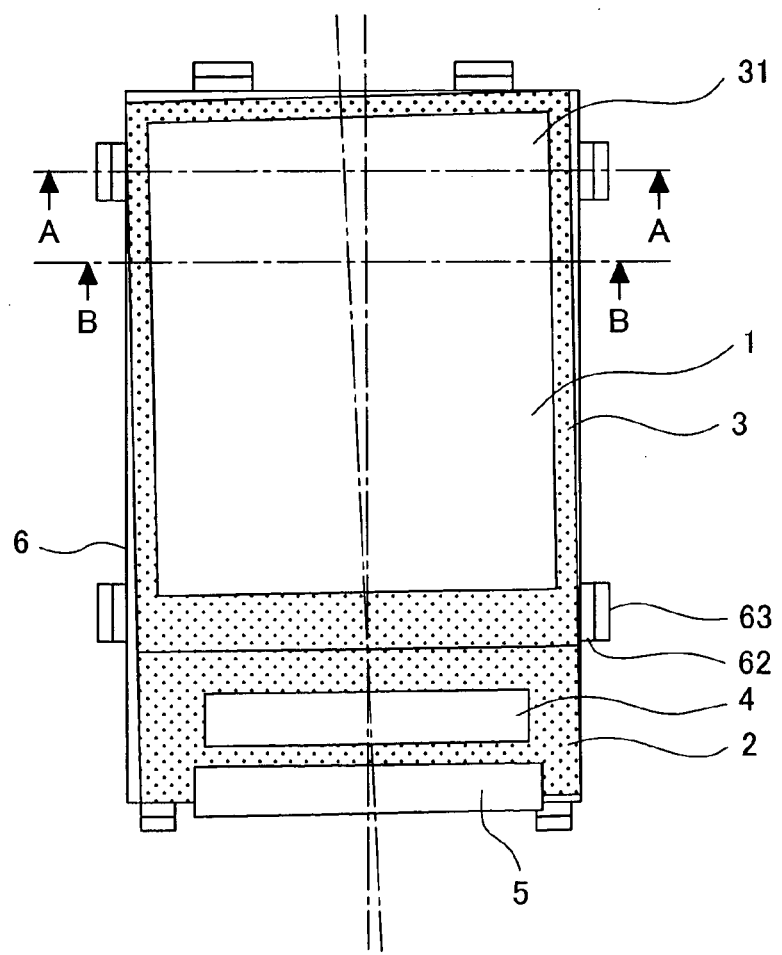
FIG. 4 is a plan view illustrating a situation of a manufacturing process of the liquid crystal display device according to the first embodiment.

As described above, with the present invention, the liquid crystal display panel 1 can be installed correctly inside the frame, because the mold 6 according to the present invention has no wall and elastic deformation of the mold 6 easily occurs when the liquid crystal display panel 1 and the mold 6 are assembled with each other. Namely, when the liquid crystal display panel 1 is placed on the mold 6 and then the mold 6 is accommodated within the frame, the liquid crystal display panel 1 can be reset in place. FIG. 4 and on are views each illustrating the process described above.

FIG. 4 is a view illustrating an example in which the liquid crystal display panel 1 is installed with an inclined posture on the mold 6. The mold 6 is not present and the liquid crystal display panel 1 is mounted on the mold 6. However, movements of the liquid crystal display panel 1 in the vertical direction and in the horizontal direction can be restricted by the projection 62 formed on the mold 6. A clearance of about 0.1 mm is provided between an edge portion of the liquid crystal display panel 1 and the projection 62 formed on the mold 6 as described above to install the liquid crystal display panel 1 in the side inner from the projection 62. Therefore, imbalance between the clearance in the left side and that in the right side along the line A-A in FIG. 4 is about 0.2 mm. This imbalance is substantially remarkable in a small display device such as a mobile phone. Although the liquid crystal display panel 1 is mounted on the mold 6, the liquid crystal display panel 1 is temporally fixed to the mold 6 with an adhesive tape 10, and in this state, the liquid crystal display panel 1 can easily be moved in the horizontal direction.

Figure 5:
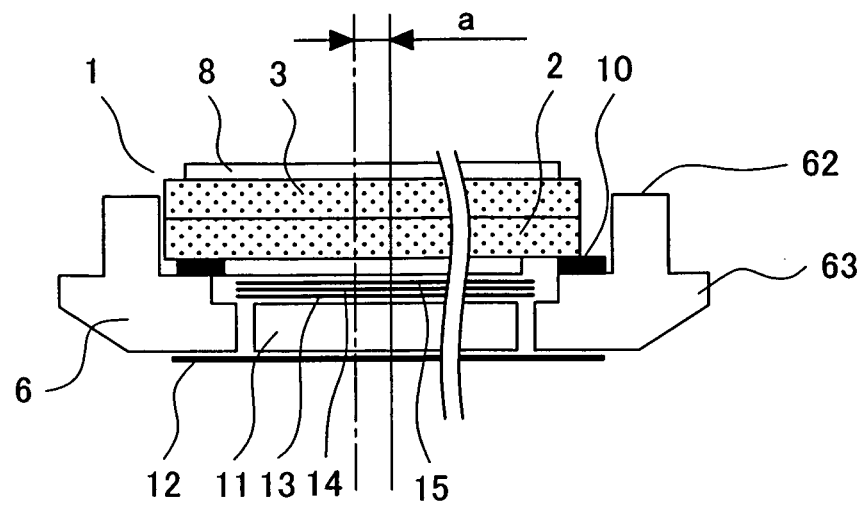
FIG. 5 is a cross-sectional view taken along the line A-A in FIG. 4.
Figure 6:
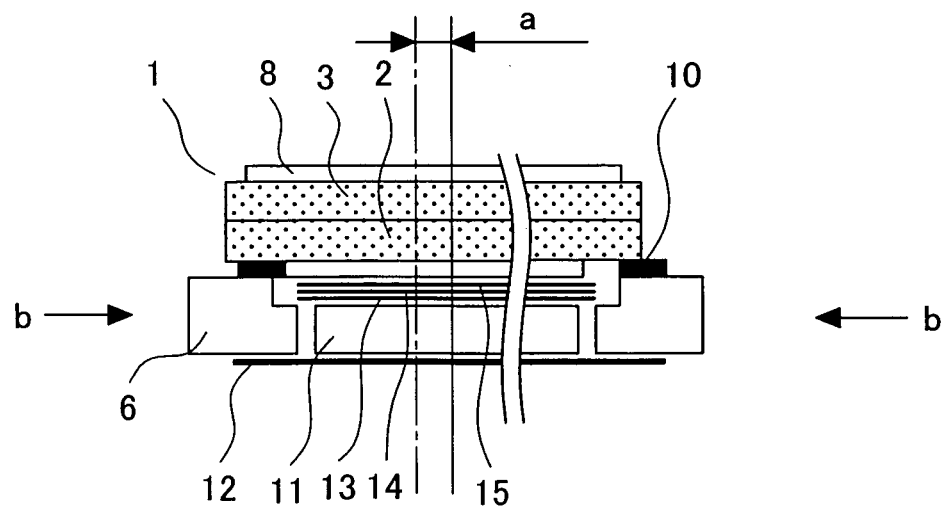
FIG. 6 is a cross-sectional view taken along the line B-B in FIG. 4.

FIG. 5 is a cross-sectional view taken along the line A-A in FIG. 4. FIG. 5 illustrates a state in which the liquid crystal display panel 1 is displaced toward one side of the mold 6. Namely, clearances between the projection 62 formed on the mold 6 and the liquid crystal display panel 1 are different in the right and left sides. FIG. 6 is a cross-sectional view taken along the line B-B in FIG. 4. FIG. 5 is a cross-sectional view of the mold 6 where there is neither the projection 62 nor the claw 63 thereof. As understood from comparison of FIG. 5 with FIG. 6, strength of the mold 6 is low in the section shown in FIG. 6. The portion where strength of the mold 6 is low occupies almost the entire periphery of the mold 6. In the prior art, because a wall is formed among the entire periphery of the mold 6, and therefore the mold 6 in this embodiment can be deformed by a force in the direction b shown in FIG. 6 more easily as compared to the mold 6 based on the conventional technique.

Figure 7:
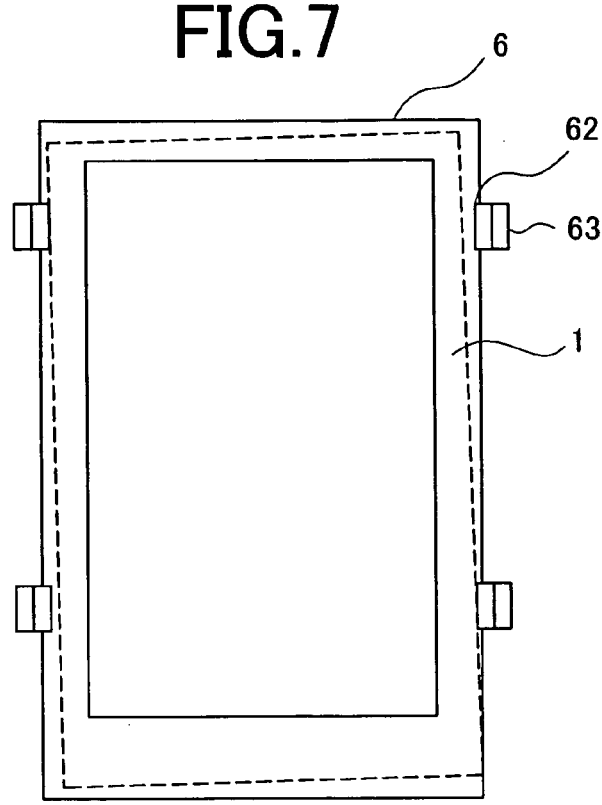
FIG. 7 is a plan view schematically showing a situation of a manufacturing process of the liquid crystal display device according to the first embodiment.

The mold 6 is substantially square as shown in FIG. 7. FIG. 7 is a view illustrating the state where basically the mold 6 has been taken out from the state shown in FIG. 4. A back light is accommodated within the mold 6 shown in FIG. 7. A dotted line in FIG. 7 shows a contour of the liquid crystal display panel 1. In FIG. 7, the longer edge side has the projection 62 and the claw 63. In FIG. 7, the projection 62 and the claw 63 in the shorter edge side are not shown. The liquid crystal display panel 1 is mounted on the mold 6 with an inclination against the mold 6. The liquid crystal display panel 1 is mounted on the mold 6 with an inclination with respect to the mold 6. This inclination is defined by the projection 62 formed on the mold 6.

Figure 8:
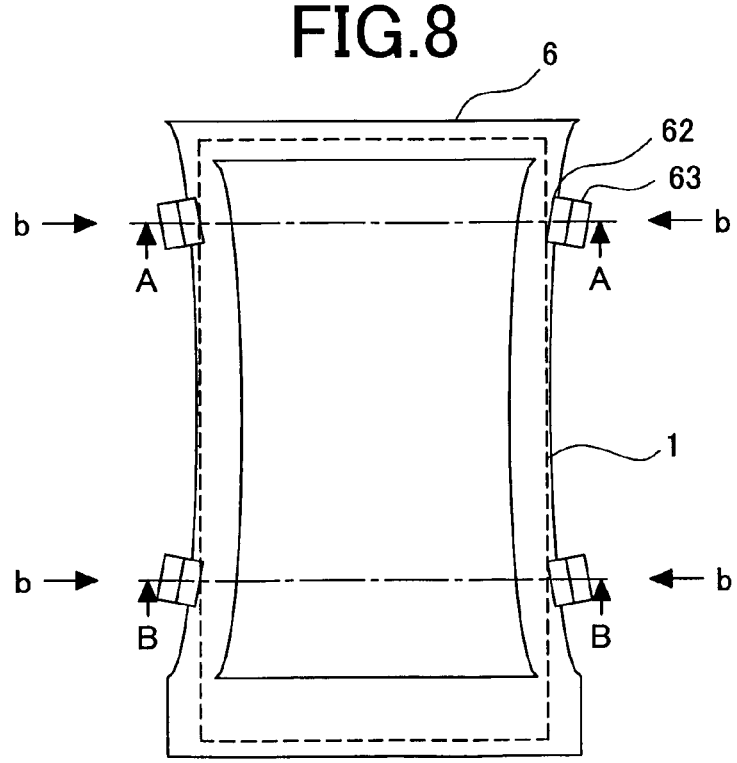
FIG. 8 is a plan view schematically showing another situation of the manufacturing process of the liquid crystal display device according to the first embodiment.

Because there is no wall for the mold 6, the mold 6 easily deforms in response to a force applied from the outside. FIG. 8 illustrate the state in which when a force b is applied from the outside by a claw to the mold 6 with the liquid crystal display panel 1 mounted thereon shown in FIG. 7, the mold 6 deforms. As shown in FIG. 8, when the force b is applied to the claw 63 on the mold 6, a longer edge of the mold is deformed into an arched form. When the longer edge of the mold 6 is deformed into the arched form, the projection 62 abuts an edge portion of the liquid crystal display panel 1 and moves the liquid crystal display panel 1 toward the inner side. In this state, the liquid crystal display panel 1 is temporally fixed to the mold 6, and therefore the liquid crystal display panel 1 can easily move with respect to the mold 6 in the horizontal direction. Therefore, the inclination of the liquid crystal display panel 1 with respect to the mold 6 is corrected simultaneously when the mold 6 is set inside the frame.

Figure 9:
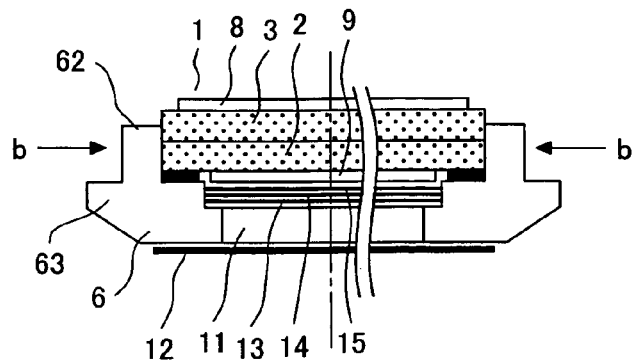
FIG. 9 is a cross-sectional view schematically showing still another situation of the manufacturing process of the liquid crystal display device according to the first embodiment.

FIG. 9 illustrates cross sections of the liquid crystal display panel 1, the mold 6, and the back light taken along the line A-A in FIG. 8. FIG. 9 shows the state in which the projections 62 at both edges of the mold 6 presses an edge of the liquid crystal display panel 1. On the other hand, also the cross-sectional view taken along the line B-B in FIG. 8 shows the same state. Therefore, when the force b is applied from the outside to the two claws 63 formed on each of the longer edges of the mold 6, a center of the liquid crystal display panel 1 coincides with that of the mold 6. In addition, because the liquid crystal display panel 1 is fixed to the mold 6 only temporally, the liquid crystal display panel 1 can easily be moved with respect to the mold 6.

Figure 10:
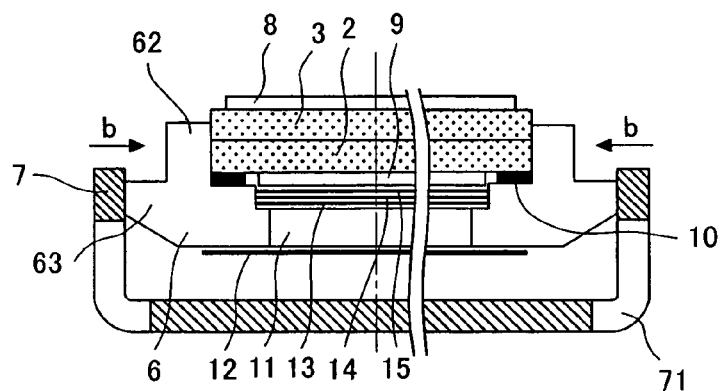
FIG. 10 is a cross-sectional view showing still another situation of the manufacturing process of the liquid crystal display device according to the first embodiment.

FIG. 10 illustrates a situation during the operation of inserting the mold 6 with the liquid crystal display panel 1 mounted thereof into the frame 7. Since the claw 63 is inserted to a notch of the frame 7, either one of the frame 7 and the mold 6 is required to be elastically deformed before the claw 63 is inserted into the notch. In the conventional technique, because there is a wall in the mold and the mechanical strength is large, the frame 7 elastically deforms. In this embodiment, however, there is not a wall for the mold 6, the mechanical strength of the mold is small, and therefore not the frame 7 but the mold 6 elastically deforms.

Namely, the force b shown in FIG. 8 can automatically be applied from the outside when the mold 6 is inserted into the frame 7. The force b shown in FIG. 10 is the same as the force b shown in FIG. 8. In addition, because the two claws 63 are formed on each longer edge of the mold 6, the same effect as that shown in FIG. 8 is provided that a center of the liquid crystal display panel 1 easily coincides with that of the mold 6. Furthermore, because the liquid crystal display panel 1 is only temporally fixed to the mold 6, the liquid crystal display panel 1 can easily be moved on the mold 6. Therefore, even when the liquid crystal display panel 1 is inclined with respect to the mold 6, this inclination can easily be corrected.

Figure 11:
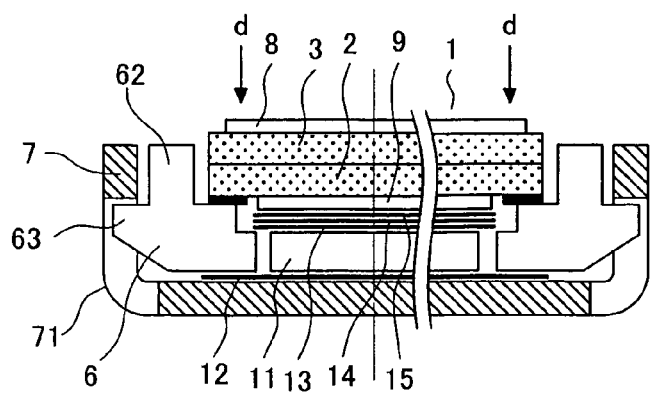
FIG. 11 is a cross-sectional view showing a final step of the manufacturing process of the liquid crystal display device according to the first embodiment.

FIG. 11 shows the state in which the claws 63 of the mold 6 have been inserted into notches 71 of the frame 7 and the mold 6 has been tightly fixed to the frame 7. In this state, elastic deformation of the mold 6 has been dissolved. As shown in FIG. 11, a clearance between the projection 62 of the mold 6 and an edge of the liquid crystal display panel 1 in the left side of the liquid crystal display panel 1 is identical to that in the right side thereof. The state described above is also applicable to clearances between the claws 63 and the projections 62 formed on another longer edge, and therefore when the mold 6 is set in the frame 7, the inclinations of the liquid crystal display panel 1 and a display surface thereof against the frame 7, namely with respect to the liquid crystal display panel 1 are dissolved. Then, as shown in FIG. 11, when a force is applied to the liquid crystal display panel 1 in the direction d, the liquid crystal display panel 1 is tightly fixed to the mold 6 with the adhesive tape 10.

FIG. 1 is a plan view of a product according to this embodiment. In FIG. 1, the projections 62 of the mold 6 are formed on each of the longer edges at positions corresponding to the positions where the TFT substrate 2 of the liquid crystal display panel 1 is overlaid on the color filter substrate 3. In the case of a small-size liquid crystal device for a mobile phone, it is required to reduce not only outside dimensions, but also a thickness thereof. The TFT substrate 2 or the color filter substrate 3 used in the liquid crystal display panel 1 is as thin as about 0.2 mm. The mechanical strength of the glass substrate as described above is low, and the glass substrate may easily be broken.

In this embodiment, the claws 63 and the projections 62 are formed on longer edges of the mold 6 at positions where the TFT substrate 2 of the liquid crystal display panel 1 is overlaid on the color filter 3. Therefore, the mechanical strength of the section where the TFT substrate 2 of the liquid crystal display panel 1 is overlaid on the color filter 3 are stronger twice or more because the mechanical strength of the sealing material is added. This allows breakage of a glass substrate to be prevented during a fabrication process of the mold 6 with the frame 7, even when a force is applied by the mold 6 to an edge of the liquid crystal display panel 1.

As described above, with the present invention, when the liquid crystal display panel 1 is mounted on the mold 6, even if an inclination is generated, the inclination is corrected during the assembly process. Thus, a fault caused by an inclination of a screen can be reduced, and the production yield can be improved. Furthermore, in the conventional technique, it is required, for preventing generation of an inclination of a screen, to make smaller a tolerance of parts and assemble components while a freedom in the work is scarified, resulting in increase in prices of the components as well as the product cost. With the present invention, it is possible to reduce faults caused by an inclination of a screen without causing increase in prices of components or the product cost.

In the description above, it is assumed that an inclination of the liquid crystal display panel 1, namely an inclination of the screen is corrected by the projections 62 and the claws 63 formed on longer edges of the mold 6. In this embodiment, because the claws 63 and the projections 62 are formed also on shorter edges of the mold 6 as shown in FIG. 1, and therefore the similar effect can also be effected by shorter edges of the mold 6. Alternatively, also the configuration is allowable in which an inclination of the screen can be adjusted by both of the claws 73 and the projections 62 formed on longer edges of the mold 6 and those formed on shorter edges of the mold 6.

Second Embodiment

Figure 12:
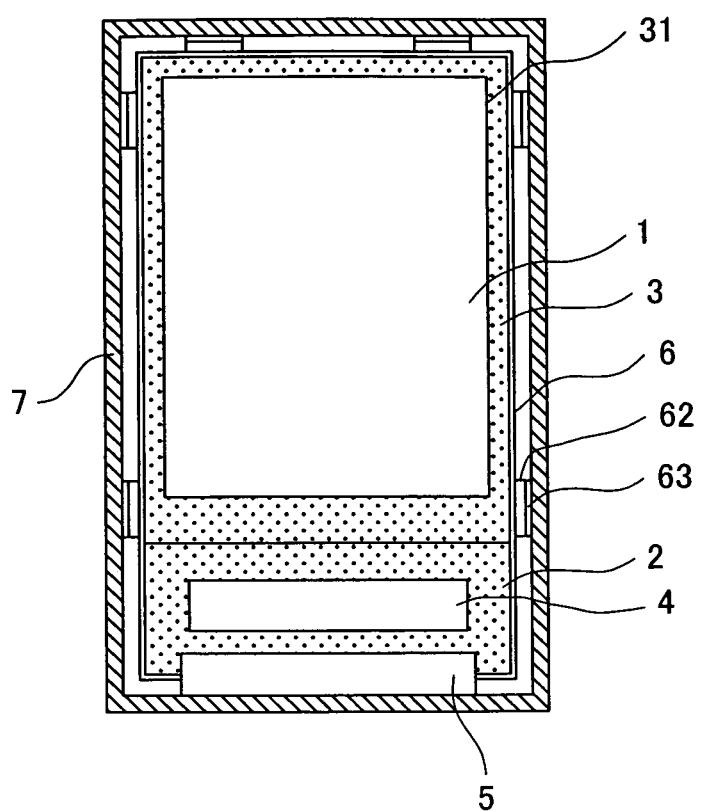
FIG. 12 is a plan view illustrating a liquid crystal display device according to a second embodiment of the present invention.

FIG. 12 is a plan view illustrating a second embodiment of the present invention. In FIG. 12, the claws 63 and the projections 62 for adjusting an inclination of the liquid crystal display panel 1 and the mold 6 are formed on longer edges of the mold 6. The claws 63 and the projections 62 formed on longer edges of the mold 6 are formed at positions corresponding to portions where the TFT substrate 2 of the liquid crystal display panel 1 and the color filter substrate 3 are overlaid on each other. As described in the first embodiment, the mechanical strength of a section where there is only one sheet of the TFT substrate 2 is low, and the TFT substrate 2 may be broken when the section is used for correction of inclinations of the liquid crystal display panel 1 and the mold 6.

In FIG. 12, the claws 63 and the projections 62 are formed only on a shorter edge of the mold 6. The TFT substrate 2 and the color filter substrate 3 are overlaid on each other at the shorter edge side. Therefore, the mechanical strength in this section of the liquid crystal display panel 1 is strong, and even when the projections 62 of the mold 6 are strongly pressed to edges of the liquid crystal display panel 1, the liquid crystal display panel 1 is prevented from being broken. In FIG. 12, the claws 63 and the projections 62 are not formed on another shorter edge of the mold 6. Only one sheet of the TFT substrate is provided at this section, and the mechanical strength of the section is a half or below as compared to the section where the color filter substrate 3 and the TFT substrate 2 are overlaid on each other. Therefore, if this section is strongly pressed by the projections of the mold 6, the TFT substrate 2 may be broken. This embodiment can avoid such risk.

If a glass substrate is directly contacted with the frame 7 made of metal, the glass substrate may be cracked. There are various types of flexible wiring substrates 5 such as that in which wiring is provided only one surface of a base film made of polyimide, or that wiring is provided on both surface of a base film made of polyimide. However, the wiring is provided in most cases on only one surface of a polyimide-made base film. FIG. 12 illustrates an example of the flexible wiring substrate 5 in which wiring is provided only one surface of a base film made of polyimide. In this case, the polyimide side of the flexible wiring substrate 5 contacts the frame 7 made of metal. In this embodiment, direct contact between the glass substrate and the frame 7 made of metal is prevented by the flexible wiring substrate 5 attached to an edge of the TFT substrate 2. When it is necessary to use the flexible wiring substrate 5 in which wiring is provided on both surfaces of a polyimide base film, a configuration in which the flexible wiring substrate 5 is not directly contacted with the frame 7 made of metal is required to prevent breakage of the wiring or other troubles. As described above, in the second embodiment of the present invention, the projections 62 and the claws 63 of the mold 6 are formed only in the sections where the TFT substrate 2 of the liquid crystal display panel 1 and the color filter substrate 3 are overlaid on each other. Therefore an inclination of the display area 31 of the liquid crystal display panel 1 can be corrected and at the same time breakage of the liquid crystal display panel 1 can be prevented.

Third Embodiment

Figure 13:
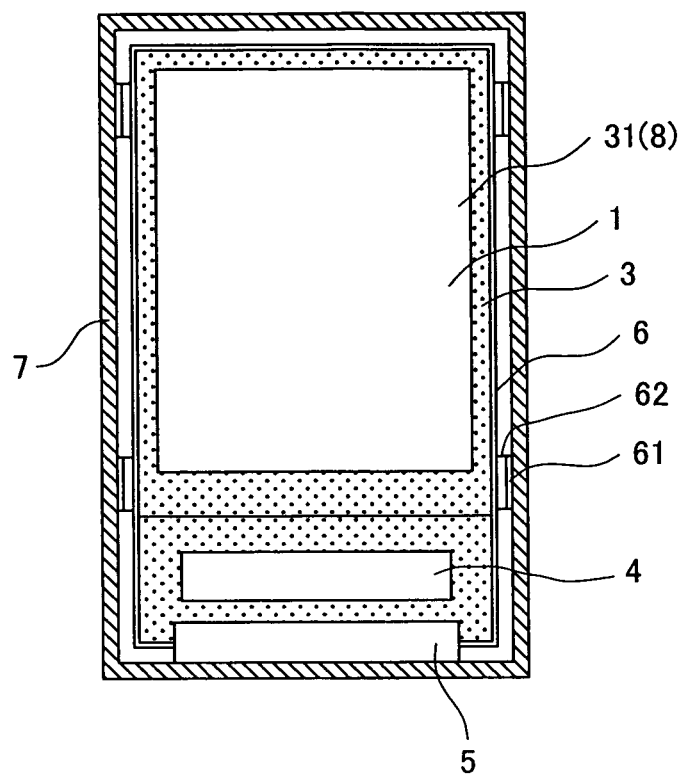
FIG. 13 is a plan view illustrating a liquid crystal display device according to a third embodiment of the present invention.
Figure 14:
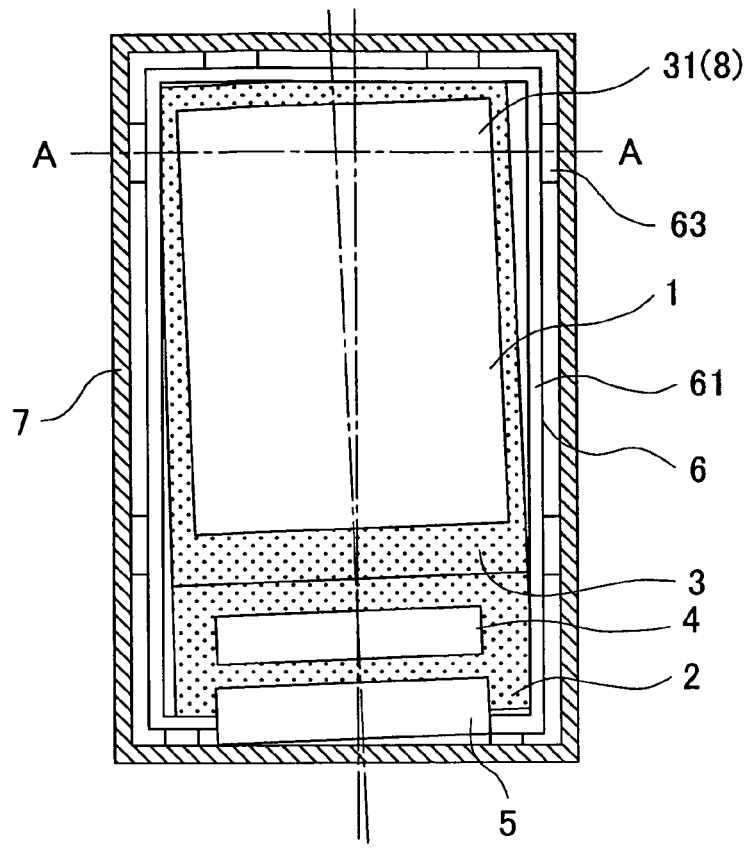
FIG. 14 is a plan view illustrating a liquid crystal display device based on the conventional technique.
Figure 15:
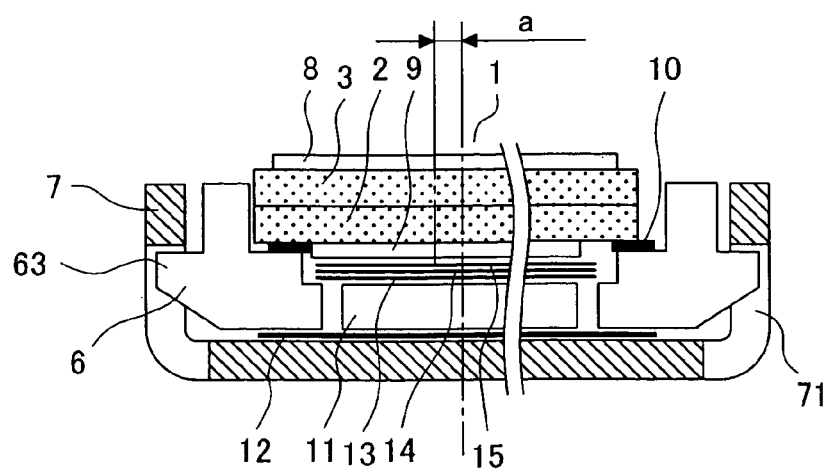
FIG. 15 is a cross-sectional view of the liquid crystal display device shown in FIG. 14.
Figure 16:
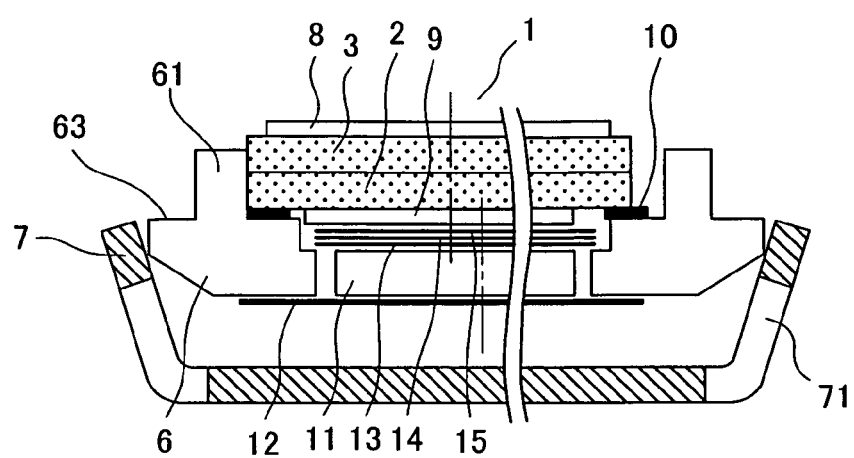
FIG. 16 is a view illustrating a situation of a manufacturing process of a liquid crystal display device based on the conventional technique.

FIG. 13 is a plan view illustrating a third embodiment of the present invention. In FIG. 13, the claws 63 and the projections 62 for adjusting an inclination of the liquid crystal display panel 1 and the mold 6 are formed on longer edges of the mold 6. The claws 63 and the projections 62 are formed on longer edges of the mold 6 at positions corresponding to portions where the TFT substrate 2 of the liquid crystal display panel 1 and the color filter substrate 3 are overlaid on each other. This configuration is desirable, because, as described in the first embodiment, the mechanical strength of a section where there is only one sheet of TFT substrate 2 is low and the TFT substrate 2 may be broken when the section is used for adjusting inclinations of the liquid crystal display panel 1 and the mold 6.

In this embodiment, the projections 62 and the claws 63 are not formed on shorter edges of the mold 6. Because the shorter edges are short, the effect of correcting inclinations of the display area 31 of the liquid crystal display panel 1 is smaller as compared to that provided on the longer edges. In addition, the liquid crystal display device can be made smaller in a longitudinal direction because the projections 62 and the claws 63 are not provided on shorter edges of the mold 6. Furthermore, because the projections 63 and the claws 63 are not provided on shorter edges of the mold 6, the workability is improved when the mold 6 is set in the frame 7. Furthermore direct contact in the shorter edge side between the glass substrate and the frame 7 can be prevented by controlling a tolerance in dimensions of the notch 71 formed on longer edges of the mold 6 and the claws 63 formed on the longer edges of the mold 6 and inserted in the notch 71.

In the embodiment described above, two projections 62 and two claws 63 are formed on each of the longer edges of the mold 6, but the present invention is not limited to this configuration, and the same effect can be achieved also even when one or more projections 62 and claws 63 are formed on each of the longer edges of the mold 6.

What is claimed is:

1. A liquid crystal display device comprising:
 a liquid crystal display panel having
  a TFT substrate on which pixel electrodes and thin film transistors for controlling signals to the pixel electrodes are provided in the matrix state, and
  a color filter substrate on which color filters associated with the pixel electrodes are formed; and
 a mold on which the liquid crystal display panel is placed, the mold having long side portions, short side portions and corners;
 wherein projections are formed in segments at an outside of a top surface of the mold along a long side portion of the mold such that there are locations between the projections along the long side portion of the mold at which the projections are not formed, projections are not formed at the corners of the mold, and
 the liquid crystal display panel is confined in an inner side of the projections, and the mold has a bottom portion with a single opening defined such that the short side portions and the long side portions of the mold are flexibly deformable in a direction parallel to a major surface of the liquid crystal display panel so as to allow inclination of the liquid crystal device with respect to the mold to be corrected when the liquid crystal display panel is set in a frame.

2. The liquid crystal display device according to claim 1, wherein a plurality of discontinuous projections are formed on each of the long sides of the mold.

3. The liquid crystal display device according to claim 1, wherein two projections are formed in the discontinuous state on each of the long sides of the mold.

4. The liquid crystal display device according to claim 1, wherein the discontinuous projections formed on the long side of the mold are formed at a position corresponding to a portion where the TFT substrate and the color filter substrate of the liquid crystal display panel are overlaid on each other.

5. A liquid crystal display device comprising:
a liquid crystal display panel having
a TFT substrate on which pixel electrodes and thin film transistors for controlling signals to the pixel electrodes are provided in the matrix state, and
a color filter substrate on which color filters associated with the pixel electrodes are formed; and
a mold on which the liquid crystal display panel is placed, the mold having long side portions, short side portions and corners; and
wherein projections are provided in segments at an outside of a top surface of the mold along a short side portion of the mold such that there are locations between the projections along the short side portion of the mold at which the projections are not formed, projections are not formed at the corners of the mold, and
the liquid crystal display panel is confined in an inner side of the projections and the mold has a bottom portion with a single opening defined such that the short side portions and the long side portions of the mold are flexibly deformable in a direction parallel to a major surface of the liquid crystal display panel so as to allow inclination of the liquid crystal display device with respect to the mold to be corrected when the liquid crystal display panel is set in a frame.

6. The liquid crystal display device according to claim 5, wherein the discontinuous projections formed on a short side of the mold are formed at a position corresponding to a portion in which the TFT substrate and the color filter substrate of the liquid crystal display panel are overlaid on each other.

7. The liquid crystal display panel according to claim 5, wherein a flexible wiring substrate for supplying power and image signals the liquid crystal display panel is attached to a shorter edge of the TFT substrate, and the discontinuous projections are not provided on an edge of the mold associated with the edge of the TFT substrate with the flexible wiring substrate attached thereto.

8. A liquid crystal display device comprising:
a liquid crystal display panel having
a TFT substrate on which pixel electrodes and thin film transistors for controlling signals to the pixel electrodes are provided in the matrix state, and
a color filter substrate on which color filters associated with the pixel electrodes are formed;
a mold on which the liquid crystal display panel is placed, the mold having long side portions, short side portions and corners; and
a frame for accommodating the mold therein;
wherein projections are formed in segments at an outside of a top surface of a long side portion thereof such that there are locations between the projections along the long side portion of the mold at which the projections are not formed, projections are not formed at the corners of the mold,
the liquid crystal display panel is confined in an inner side of the projections, and the mold has a bottom portion with a single opening defined such that the short side portions and the long side portions of the mold are flexibly deformable in a direction parallel to a major surface of the liquid crystal display panel so as to allow inclination of the liquid crystal display device with respect to the mold to be corrected when the liquid crystal display panel is set in a frame, and
a notch is formed on a side face of the frame, and a claw to be inserted into the notch on the frame is formed on a side face of the mold.

9. The liquid crystal display device according to claim 8, wherein the projection formed on a top surface of the mold along a long side thereof and the claw formed on a side face of the mold along a long side thereof are formed at the same position on the mold.

10. The liquid crystal display device according to claim 8, wherein two projections and two claws of the mold are formed on a long side of the mold, and two notches of the frame are formed on a long side of the frame.

11. A liquid crystal display device comprising:
a liquid crystal display panel having
a TFT substrate on which pixel electrodes and thin film transistors for controlling signals to the pixel electrodes are provided in the matrix state, and
a color filter substrate on which color filters associated with the pixel electrodes are formed; and
a mold on which the liquid crystal display panel is placed, the mold having a continuous frame shape that includes a short side, a long side and corners;
wherein projections are formed in segments at an outside of a top surface of the mold along the short side of the mold such that there are locations between the projections along the short side of the mold at which the projections are not formed, projections not being formed at the corners of the mold;
the liquid crystal display panel is confined in an inner side of the upstanding portion the projections, and the mold has a bottom portion with a single opening defined such that the short side and the long side of the mold are flexibly deformable in a direction parallel to a major surface of the liquid crystal display panel so as to allow inclination of the liquid crystal display device with respect to the mold to be corrected when the liquid crystal display panel is set in a frame,
a notch is formed on a side face of the frame along a short side thereof, and
a claw to be inserted into the notch on the frame is formed on a side face of the mold along a short side thereof.

12. The liquid crystal display device according to claim 11, the discontinuous projections formed on a short side of the mold are formed at a position corresponding to a portion where the TFT substrate and the color filter substrate of the liquid crystal display panel are overlaid on each other.

13. The liquid crystal display device according to claim 11, wherein a flexible wiring substrate for supplying power and image signals to the liquid crystal display panel is attached to a shorter edge of the TFT substrate, and the discontinuous projections are not provided on an edge a side of the mold associated with the edge of the TFT substrate with the flexible wiring substrate attached thereto.

* * * * *